(12) United States Patent
Masuda et al.

(10) Patent No.: US 9,949,002 B2
(45) Date of Patent: Apr. 17, 2018

(54) APPARATUS CONTROL DEVICE AND APPARATUS CONTROL METHOD

(71) Applicant: PANASONIC INTELLECTUAL PROPERTY MANAGEMENT CO., LTD., Osaka (JP)

(72) Inventors: Rikiya Masuda, Osaka (JP); Kiyotaka Takehara, Nara (JP); Yoshihisa Homma, Osaka (JP); Shinpei Hibiya, Osaka (JP); Shinya Furuta, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/510,183

(22) PCT Filed: Sep. 4, 2015

(86) PCT No.: PCT/JP2015/004494
§ 371 (c)(1),
(2) Date: Mar. 9, 2017

(87) PCT Pub. No.: WO2016/038862
PCT Pub. Date: Mar. 17, 2016

(65) Prior Publication Data
US 2017/0264979 A1 Sep. 14, 2017

(30) Foreign Application Priority Data
Sep. 12, 2014 (JP) .................................. 2014-185827

(51) Int. Cl.
*H04Q 9/00* (2006.01)
*H04L 12/28* (2006.01)
*H04W 4/02* (2018.01)

(52) U.S. Cl.
CPC ........... *H04Q 9/00* (2013.01); *H04L 12/2818* (2013.01); *H04W 4/021* (2013.01); *H04L 2012/2841* (2013.01); *H04Q 2209/40* (2013.01)

(58) Field of Classification Search
CPC ....................................................... H04Q 9/00
(Continued)

(56) References Cited

U.S. PATENT DOCUMENTS

2013/0288661 A1 10/2013 Shimizu
2016/0189699 A1* 6/2016 Garet ...................... G10H 1/32
                                                        382/119

FOREIGN PATENT DOCUMENTS

JP    07-050884 A    2/1995
JP    11-313100 A    11/1999
(Continued)

OTHER PUBLICATIONS

International Search Report and Written Opinion issued in International Patent Application No. PCT/JP2015/004494, dated Nov. 10, 2015; with Englsh translation.

*Primary Examiner* — Allen T Cao
(74) *Attorney, Agent, or Firm* — McDermott Will & Emery LLP

(57) ABSTRACT

An apparatus control device includes a first communicator which communicates with a mobile terminal, a second communicator which communicates with a plurality of electrical apparatuses, a setter which sets correspondence information in which identification information of the mobile terminal is associated with identification information of an electrical apparatus controllable by the mobile terminal, and a controller which controls, when the first communicator receives a control request to control a target electrical apparatus from the mobile terminal, communication of the second communicator such that the second communicator (Continued)

transmits a control command to the target electrical apparatus if the identification information of the mobile terminal is associated with identification information of the target electrical apparatus, and such that the second communicator does not transmit the control command to the target electrical apparatus if the identification information of the mobile terminal is not associated with the identification information of the target electrical apparatus.

7 Claims, 3 Drawing Sheets

(58) Field of Classification Search
USPC .................................................. 340/9.1–9.13
See application file for complete search history.

(56) References Cited

FOREIGN PATENT DOCUMENTS

| | | |
|---|---|---|
| JP | 2003-309884 A | 10/2003 |
| JP | 2004-180260 A | 6/2004 |
| JP | 2008-042262 A | 2/2008 |
| JP | 2010-034957 A | 2/2010 |
| JP | 2013-062672 A | 4/2013 |
| WO | 2012/105241 A1 | 8/2012 |

* cited by examiner

APPARATUS CONTROL DEVICE AND APPARATUS CONTROL METHOD

RELATED APPLICATIONS

This application is the U.S. National Phase under 35 U.S.C. § 371 of International Patent Application No. PCT/JP2015/004494, filed on Sep. 4, 2015, which in turn claims the benefit of Japanese Application No. 2014-185827, filed on Sep. 12, 2014, the disclosures of which applications are incorporated by reference herein.

TECHNICAL FIELD

The present disclosure relates to apparatus control devices, and more specifically relates to apparatus control devices which control electrical apparatuses used in buildings.

BACKGROUND ART

Remote control devices which control a variety of apparatuses through wireless LANs have been proposed (for example, see PTL 1).

In such remote control devices, a group of apparatuses connected to the network is detected through operation of an icon for detecting apparatuses connected to a network. These apparatuses are displayed in the form of icons in the latest order of the detection. These apparatuses are operated through operation of their corresponding icons.

CITATION LIST

Patent Literature

PTL 1: Japanese Unexamined Patent Application Publication No. 2003-309884

SUMMARY OF THE INVENTION

Technical Problem

Any of the apparatuses is operated using the remote control devices. For this reason, if an apparatus is operated in a desired operational state using one remote control device, and subsequently the same apparatus is operated using another remote control device, the operational state of the apparatus may be changed.

The present disclosure has been made in consideration of such a problem. An object of the present disclosure is to provide an apparatus control device which can restrict controllable electrical apparatuses for mobile terminals.

Solutions to Problem

The apparatus control device according to one aspect of the present disclosure includes an apparatus control device, comprising: a first communicator which communicates with a mobile terminal carried and used by a user; a second communicator which communicates with a plurality of electrical apparatuses used in a building; a setter which sets correspondence information in a storage, the correspondence information associating identification information of the mobile terminal with identification information of an electrical apparatus controllable by the mobile terminal among the plurality of electrical apparatuses; and a controller which controls, when the first communicator receives, from the mobile terminal, a control request to control a target electrical apparatus among the plurality of electrical apparatuses, communication of the second communicator such that the second communicator transmits a control command to the target electrical apparatus if the identification information of the mobile terminal, which is a source of transmitting the control request, is associated with identification information of the target electrical apparatus in the correspondence information, and such that the second communicator does not transmit the control command to the target electrical apparatus if the identification information of the mobile terminal, which is the source of transmitting the control request, is not associated with the identification information of the target electrical apparatus in the correspondence information.

The apparatus controlling method according to one aspect of the present disclosure includes an apparatus controlling method, comprising: first communicating with a mobile terminal carried and used by a user; second communicating with a plurality of electrical apparatuses used in a building; setting correspondence information in a storage, the correspondence information associating identification information of the mobile terminal with identification information of an electrical apparatus controllable by the mobile terminal among the plurality of electrical apparatuses; and controlling, when a control request to control a target electrical apparatus among the plurality of electrical apparatuses is received from the mobile terminal in the first communicating, the communication in the second communicating such that a control command to the target electrical apparatus is transmitted if the identification information of the mobile terminal, which is a source of transmitting the control request, is associated with identification information of the target electrical apparatus in the correspondence information, and such that the control command is not transmitted to the target electrical apparatus if the identification information of the mobile terminal, which is the source of transmitting the control request, is not associated with the identification information of the target electrical apparatus in the correspondence information.

Advantageous Effect of Invention

The apparatus control device according to one aspect of the present disclosure can restrict controllable electrical apparatuses for mobile terminals.

DESCRIPTION OF EXEMPLARY EMBODIMENT

The apparatus control device according to the present embodiment will now be described with reference to the drawings. It should be noted that the configuration described below is only an illustration of the present disclosure. The present disclosure will not be limited to the following embodiment, and a variety of modifications can be made according to design without departing technical ideas according to the present disclosure.

Figure 1:
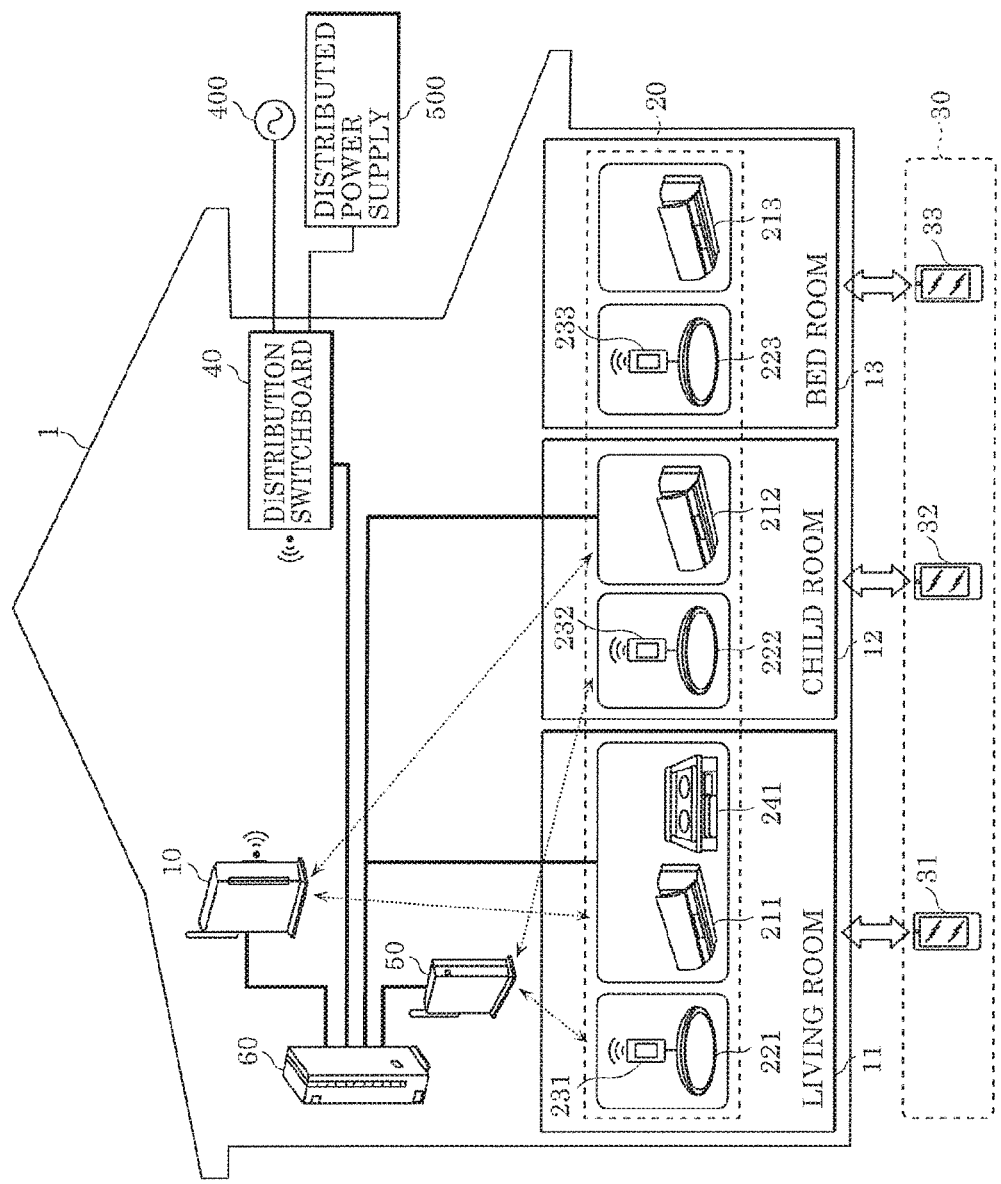
FIG. 1 is a system block diagram illustrating an energy managing system including an apparatus control device according to an embodiment.

FIG. 1 is a schematic system block diagram illustrating a control system including apparatus control device 10 according to the present embodiment.

This control system includes apparatus control device 10, electrical apparatuses 20, mobile terminal 30, distribution switchboard 40, relay adaptor 50, and router 60. The control system controls the operating states of electrical apparatuses 20 used in house 1. The building to which the control system is applied is not limited to detached house 1, and may be housing complexes, retail premises, or office buildings.

Apparatus control device 10 is a so-called home energy management system (HEMS) controller. Apparatus control device 10 is connected to a plurality of electrical apparatuses 20 through a local area network (LAN) provided in house 1, and manages electrical apparatuses 20 through communication with electrical apparatuses 20. In this embodiment, the management of electrical apparatuses 20 means both monitoring of electrical apparatuses 20 and control of electrical apparatuses 20. This term may refer to only monitoring or control of electrical apparatuses 20. The term "control" may refer to operation in some cases.

Electrical apparatuses 20 are electrical apparatuses used in house 1. Examples of electrical apparatuses 20 include air conditioners 211 to 213, light fixtures 221 to 223, and electromagnetic cooker 241. In house 1 here, room 11 used as a living room includes air conditioner 211, light fixture 221, and electromagnetic cooker 241. Room 12 used as a child room includes air conditioner 212 and light fixture 222. Room 13 used as a bed room includes air conditioner 213 and light fixture 223.

Among electrical apparatuses 20 to be controlled, air conditioners 211 to 213 and electromagnetic cooker 241 have communication function to perform communication according to a communication protocol standardized for a home network. These apparatuses communicate with apparatus control device 10 through router 60. In contrast, light fixtures 221 to 223 have no communication function, and cannot perform direct communication with apparatus control device 10. In the control system according to the present embodiment, wireless communication function is provided in switching device 231 which turns on and off light fixture 221, switching device 232 which turns on and off light fixture 222, and switching device 233 which turns on and off light fixture 223. Switching devices 231, 232, and 233 thereby perform wireless communication with relay adaptor 50.

Relay adaptor 50 is connected to apparatus control device 10 through router 60. Switching devices 231, 232, and 233 each communicate with apparatus control device 10 through relay adaptor 50 and router 60.

Distribution switchboard 40 accommodates a main breaker (not illustrated), a branch breaker (not illustrated), and an interconnection breaker (not illustrated). The primary side of the main breaker is connected to AC power supply 400 such as a commercial AC power supply. The secondary side of the main breaker is connected to a plurality of branch breakers. The branch circuits branched by these branch breakers are connected to electrical apparatuses 20 described above to distribute electricity from distribution switchboard 40 to electrical apparatuses 20 connected to the branch circuits. The interconnection breaker is connected to distributed power supply 500 such as a photovoltaic system and fuel batteries. The electricity generated by distributed power supply 500 is used in electrical apparatuses 20 in house 1, or is flowed back to an electricity system.

Mobile terminal 30 is a mobile terminal for operating electrical apparatuses 20 to be controlled. Examples thereof include mobile terminals exclusively used by specific users, such as smartphones and tablet computers.

Figure 2:
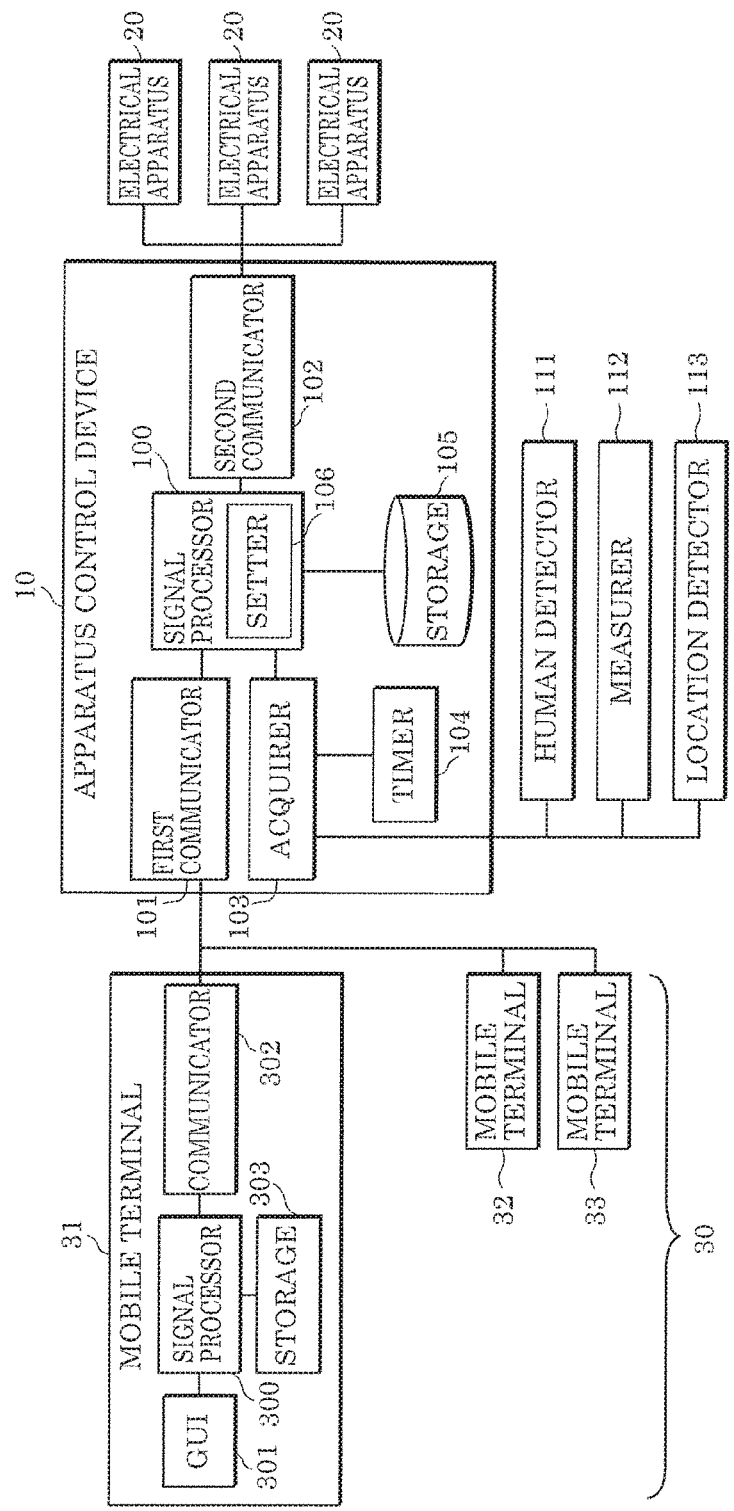
FIG. 2 is a block diagram illustrating the energy managing system including an apparatus control device according to an embodiment.

As illustrated in FIG. 2, mobile terminal 30 includes signal processor 300, graphical user interface (GUI) 301, communicator 302, and storage 303.

Signal processor 300 includes a microcomputer which executes a control program stored in storage 303 to implement a predetermined function, for example.

GUI 301 is a combination of an image display device, such as a liquid crystal display and an electroluminescent (EL) display with a backlight, and an input device, such as a touch pad. The content displayed by GUI 301 is controlled by signal processor 300. The content of an operation input with GUI 301 is output to signal processor 300. Communicator 302 communicates with apparatus control device 10 by a wireless communication method requiring no license, for example. Examples of such communication methods include specified low power wireless communication, a wireless communication method according to IEEE 802.15.1, and a wireless communication method according to IEEE 802.15.4, which are communications standards specified by Institute of Electrical and Electronics Engineers (IEEE) (USA).

Storage 303 includes a read only memory (ROM), a random access memory (RAM), and an electrically rewritable nonvolatile memory such as an electrically erasable and programmable read only memory (EEPROM). Storage 303 stores control programs, and identification information assigned to mobile terminal 30.

Three mobile terminals 30 are used in the present embodiment, and these three mobile terminals 31, 32, and 33 are carried and used by specific users, respectively. For example, mobile terminal 31 is carried by a user who most frequently uses room 11. Mobile terminal 32 is carried by a user who most frequently uses room 12. Mobile terminal 33 is carried by a user who most frequently uses room 13.

The configuration of apparatus control device 10 will now be described in more detail with reference to FIG. 2.

Apparatus control device 10 includes signal processor (controller) 100, first communicator 101, second communicator 102, acquirer 103, timer 104, and storage 105. These are optional components. Part of these components may be eliminated, or may be implemented by another device. For example, among these components, apparatus control device 10 may include only first communicator 101, second communicator 102, setter 106, and signal processor 100.

Signal processor 100 includes a microcomputer which executes a control program stored in storage 105 to implement a predetermined function, for example. In the present embodiment, the function of setter 106 is implemented in signal processor 100 through execution of the control program by the microcomputer. Setter 106 sets correspondence information for each of a plurality of mobile terminals 30 in storage 105, the correspondence information associating the identification information of mobile terminal 30 with the identification information of electrical apparatus 20 controllable by mobile terminal 30. In other words, setter 106 registers the correspondence information in storage 105. In this embodiment, electrical apparatus 20 controllable by mobile terminal 30 refers to electrical apparatus 20 whose control by mobile terminal 30 is permitted.

First communicator 101 is a wireless communication module which communicates with apparatus control device 10 by a license-free wireless communication method.

Second communicator 102 is a communication module which communicates with electrical apparatuses 20 through an LAN.

Acquirer 103 acquires the current state value to be used to determine the restriction condition. The restriction condition is a condition for restricting mobile terminal 30 and electrical apparatuses 20 which can be controlled by mobile terminal 30, for example, a condition for determining whether electrical apparatuses 20 controllable by mobile terminal 30 are restricted or not. If the restriction condition is satisfied, signal processor 100 restricts mobile terminal 30 and electrical apparatuses 20 controllable by mobile terminal 30. As the current state value, acquirer 103 acquires the current time counted by timer 104, the human detection information obtained by human detector 111, the power consumption amount of electrical apparatus 20 measured by measurer 112, and the current location of mobile terminal 30 detected by location detector 113, for example.

Timer 104 counts the current time.

Storage 105 includes a ROM, a RAM, and an electrically rewritable nonvolatile memory such as an EEPROM. Storage 105 stores the control program, and the correspondence information in which mobile terminal 30 is associated with electrical apparatuses 20 controllable by mobile terminal 30. In the present embodiment, apparatus control device 10 includes storage 105 which stores the correspondence information. An external storage device connected to apparatus control device 10 through a network may store the correspondence information.

Human detector 111 detects whether or not a person is present in a place where target electrical apparatus 20 is installed. Human detector 111 includes a pyroelectric infrared detecting element sensitive to the heat rays emitted from a human body. Based on whether the infrared detecting element can detect heat rays or not, human detector 111 detects whether a person is present in the detection area or not, and outputs the result of detection to acquirer 103.

Measurer 112 is disposed in distribution switchboard 40, for example, to measure the power consumption amount of each branched circuit, the power consumption amount of each electrical apparatus 20, and the entire power consumption amount of house 1, and to output the results of measurement to acquirer 103.

Location detector 113 includes beacon transmitters (not illustrated) disposed in the rooms of house 1. Specifically, mobile terminal 30 includes an application which receives a beacon signal transmitted from the beacon transmitter, and returns the ID of the beacon transmitter added to the beacon signal and the identification information of mobile terminal 30. Based on the ID and the identification information contained in the return signal from mobile terminal 30, location detector 113 detects the room in which mobile terminal 30 is present, and outputs the result of detection to acquirer 103.

The operation of the control system including apparatus control device 10 according to the present embodiment will now be described.

In the initial use of the control system, a user operates GUI 301 of mobile terminal 30 to execute processing to detect target electrical apparatuses 20 in signal processor 300. In this processing, apparatus control device 10 collects information such as the identification information of each of target electrical apparatuses 20, the names of the apparatuses, and the locations of the apparatuses installed, and preliminarily stores the information in storage 105.

Signal processor 300 controls communicator 302 to communicate with apparatus control device 10, and acquires the information of electrical apparatuses 20 used in house 1 (information such as the identification information of each of electrical apparatuses 20, the names of the apparatuses, and the locations of the apparatuses installed) from apparatus control device 10. Mobile terminal 30 may acquire the information, such as the identification information, the names of the apparatuses, and the locations of the apparatuses installed, from electrical apparatuses 20 through direct communication with electrical apparatuses 20.

When signal processor 300 acquires the information of electrical apparatuses 20 from apparatus control device 10, the acquired information of electrical apparatuses 20 is displayed on the screen of GUI 301. The user operates GUI 301 to select electrical apparatuses 20 controllable by mobile terminal 30; then, the information of electrical apparatuses 20 controllable by mobile terminal 30 is stored in storage 303 by signal processor 300. Signal processor 300 transmits the information of electrical apparatuses 20 controllable by mobile terminal 30 and the identification information of mobile terminal 30 from communicator 302 to apparatus control device 10.

In apparatus control device 10, the information transmitted from mobile terminal 30 (the information of electrical apparatuses 20 controllable by mobile terminal 30 and the identification information of mobile terminal 30) is received by first communicator 101; then, the information is stored in storage 105 by setter 106. Thereby, for each mobile terminal 30, the correspondence information in which the identification information of mobile terminal 30 is associated with the identification information of electrical apparatus 20 controllable by mobile terminal 30 is set in storage 105.

Table 1 below shows an example of the correspondence information registered in storage 105. In the correspondence information in Table 1, air conditioner 211, light fixture 221, and electromagnetic cooker 241 in room 11 are associated with mobile terminal 31 as electrical apparatuses 20 controllable by mobile terminal 31. Air conditioner 212 and light fixture 222 in room 12 are associated with mobile terminal 32 as electrical apparatuses 20 controllable by mobile terminal 32. Air conditioner 213 and light fixture 223 in room 13 are associated with mobile terminal 33 as electrical apparatuses 20 controllable by mobile terminal 33.

TABLE 1

| Mobile terminal | Electrical apparatus |
| --- | --- |
| Mobile terminal 31 | Air conditioner 211 |
| | Light fixture 221 |
| | Electromagnetic cooker 241 |
| Mobile terminal 32 | Mobile terminal 212 |
| | Light fixture 222 |
| Mobile terminal 33 | Mobile terminal 213 |
| | Light fixture 223 |

Subsequently, when an operation to operate air conditioner 211 in a cooling operational mode is performed using GUI 301 of mobile terminal 31, signal processor 300 creates a control request including the identification information of air conditioner 211, the content of the operation, and the identification information of mobile terminal 31. Signal processor 300 then transmits the control request from communicator 302 to apparatus control device 10.

When first communicator 101 of apparatus control device 10 receives the control request from mobile terminal 31, signal processor 100 reads the identification information of mobile terminal 31 and the identification information of target air conditioner 211, which are both included in the control request. Referring to the correspondence information stored in storage 105, signal processor 100 determines that air conditioner 211 is controllable by mobile terminal 31 if the identification information of mobile terminal 31 is associated with the identification information of air conditioner 211 in the correspondence information. Signal processor 100 creates a control command to control air conditioner 211 to be operated in the cooling operational mode, and transmits the control command from second communicator 102 to air conditioner 211 to operate air conditioner 211 in the cooling operational mode.

A control request to control the air conditioners 211 and 212 in the cooling operational mode may be transmitted from mobile terminal 31 to apparatus control device 10. In this case, based on the correspondence information, signal processor 100 determines that air conditioner 211 is controllable by mobile terminal 31, but determines that air conditioner 212 is uncontrollable by mobile terminal 31. In this case, signal processor 100 transmits the control command to control air conditioner 211 to be operated in the cooling operational mode from second communicator 102 to air conditioner 211, but does not transmit the control command from second communicator 102 to air conditioner 212.

Thereby, air conditioner 211 controllable by mobile terminal 31 operates in the cooling operational mode while air conditioner 212 which is not set so as to be operable (controllable) by mobile terminal 31 does not operate in the cooling operational mode, keeping the current operational state.

The correspondence information in Table 1 above is only a correspondence between mobile terminal 30 and electrical apparatus 20 controllable by mobile terminal 30. Mobile terminal 30 which can control electrical apparatus 20 may be restricted if a restriction condition is satisfied. Mobile terminal 30 which can control electrical apparatus 20 means mobile terminal 30 which is permitted to control electrical apparatus 20.

Table 2 shows an example of the correspondence information (second correspondence information) showing electrical apparatuses 20 operable by mobile terminals 31 and 32 if the restriction condition that the current time is within a predetermined time zone is satisfied.

TABLE 2

| Mobile terminal | Electrical apparatus | Time zone |
| --- | --- | --- |
| Mobile terminal 31 | Air conditioner 211 | 22:00-7:00 |
|  | Light fixture 221 | 22:00-7:00 |
| Mobile terminal 32 | Air conditioner 212 | 0:00-7:00 |

For example, the correspondence information shown in Table 2 is set in storage 105. In this case, if the current time acquired by acquirer 103 from timer 104 is within the time zone from 22 o'clock to 7 o'clock, signal processor 100 controls air conditioner 211 and light fixture 221 to be controllable only by mobile terminal 31. If the current time is not within the time zone from 22 o'clock to 7 o'clock, signal processor 100 controls air conditioner 211 and light fixture 221 to be controllable by all of mobile terminals 31 to 33.

If a restriction condition that the current time is within the time zone from 0 o'clock to 7 o'clock is satisfied, signal processor 100 controls air conditioner 212 to be controllable only by mobile terminal 32. If the restriction condition that the current time is within the time zone from 0 o'clock to 7 o'clock is not satisfied, signal processor 100 controls air conditioner 212 to be controllable by all of mobile terminals 31 to 33.

In other words, all of electrical apparatuses 20 are associated with mobile terminals 31 to 33 in the first correspondence information, and all of electrical apparatuses 20 are controllable by mobile terminals 31 to 33. In this case, the first correspondence information is the correspondence information used in the case where the restriction condition is not satisfied, in which the identification information of mobile terminal 30 is associated with the identification information of electrical apparatus 20 controllable by mobile terminal 30.

In this case, the operation of apparatus control device 10 will now be described. For example, when a control request to operate air conditioner 211 in the cooling mode is transmitted from mobile terminal 31 to apparatus control device 10 at 22 o'clock, signal processor 100 in apparatus control device 10 refers to the correspondence information stored in storage 105. Air conditioner 211 is operable only by mobile terminal 31 in the time zone from 22 o'clock to 7 o'clock. Signal processor 100 then accepts the control request from mobile terminal 31, and creates a control command to operate air conditioner 211 in the cooling mode, operating air conditioner 211 in the cooling mode.

Subsequently, if a control request to stop air conditioner 211 is transmitted from mobile terminal 32 to apparatus control device 10 at 1 o'clock, signal processor 100 in apparatus control device 10 reads the correspondence information from storage 105. If the current time is 1 o'clock, mobile terminal 30 which can operate air conditioner 211 is only mobile terminal 31. Accordingly, signal processor 100 rejects the control request from mobile terminal 32, and does not stop air conditioner 211.

Thus, in the time zone from 22 o'clock to 7 o'clock, air conditioner 211 and light fixture 221 in room 11 are preferentially operated by mobile terminal 31 of the user who mainly uses room 11, rather than by other mobile terminals 32 and 33. Accordingly, the operational states of air conditioner 211 and light fixture 221 are barely changed by the other mobile terminals 32 and 33 after the user who mainly uses room 11 sets the operation of air conditioner 211 or light fixture 221 using mobile terminal 31.

Subsequently, if a control request to stop air conditioner 211 is transmitted from mobile terminal 32 to apparatus control device 10 at 8 o'clock, signal processor 100 in apparatus control device 10 refers to the correspondence information stored in storage 105. If the current time is 8 o'clock, the current time is out of the time zone (from 22 o'clock to 7 o'clock) set in Table 2. Accordingly, signal processor 100 determines that air conditioner 211 is operable by mobile terminals other than mobile terminal 31, and accepts the control request from mobile terminal 32. Signal processor 100 creates a control command to stop air conditioner 211, and transmits the control command from second communicator 102 to air conditioner 211 to stop air conditioner 211.

Thus, if the restriction condition for restricting mobile terminal 30 which can operate electrical apparatuses 20 is not satisfied, according to the control request from mobile terminal 30, apparatus control device 10 controls electrical apparatuses 20 associated with mobile terminal 30 in the first correspondence information.

In the above example, the restriction condition used to restrict mobile terminal 30 which can control electrical apparatuses 20 is the condition that the current time is within the predetermined time zone. This condition may be used in combination with an additional condition that a person is present in the place where target electrical apparatus 20 is installed.

Table 3 shows an example of the correspondence information (second correspondence information) showing mobile terminal 30 which can control electrical apparatuses 20 if the restriction condition that the current time is within the predetermined time zone and a person is present in the place where target electrical apparatus 20 is installed is satisfied.

TABLE 3

| Mobile terminal | Electrical apparatus | Time zone | Detection of person |
|---|---|---|---|
| Mobile terminal 31 | Air conditioner 211 | 22:00-7:00 | Detected |
|  | Light fixture 221 | 22:00-7:00 | Detected |
| Mobile terminal 32 | Air conditioner 212 | 0:00-7:00 | Detected |

In the case where the correspondence information as shown in Table 3 is set in storage 105, signal processor 100 controls acquirer 103 to acquire the current time from timer 104, and to acquire the result of detection, from human detector 111, the result indicating whether or not a person is present in the place where target electrical apparatus 20 is installed. Based on the information acquired by acquirer 103, signal processor 100 determines whether a restriction condition that the current time is within the predetermined time zone and a person is present in the place where target electrical apparatus 20 is installed is satisfied or not. If the restriction condition is satisfied, signal processor 100 restricts mobile terminal 30 which can control electrical apparatuses 20 to mobile terminal 30 specified in the second correspondence information.

At this time, if the restriction condition that the current time is within the time zone from 22 o'clock to 7 o'clock and a person is present in room 11 is satisfied, signal processor 100 restricts mobile terminal 30 which can control air conditioner 211 and light fixture 221 in room 11 only to mobile terminal 31. If the restriction condition is not satisfied, signal processor 100 controls air conditioner 211 and light fixture 221 to be controllable by all of mobile terminals 31 to 33.

If the restriction condition that the current time is within the time zone from 0 o'clock to 7 o'clock and a person is present in room 12 is satisfied, signal processor 100 restricts mobile terminal 30 which can control air conditioner 212 in room 12 only to mobile terminal 32. If the restriction condition is not satisfied, signal processor 100 controls air conditioner 212 to be controllable by all of mobile terminals 31 to 33.

In this case, the operation of apparatus control device 10 will now be described. For example, when a control request to operate air conditioner 211 in a cooling mode is transmitted from mobile terminal 31 to apparatus control device 10 at 22 o'clock, signal processor 100 in apparatus control device 10 refers to the correspondence information stored in storage 105. Signal processor 100 controls acquirer 103 to acquire the current time from timer 104, and to acquire human detection information of room 11, in which air conditioner 211 is installed, from human detector 111.

Based on the information acquired by acquirer 103, signal processor 100 determines that the restriction condition that the current time is within the time zone from 22 o'clock to 7 o'clock and a person is present in room 11 is satisfied; then, signal processor 100 controls air conditioner 211 to be controllable only by mobile terminal 31. At this time, signal processor 100 accepts the control request from mobile terminal 31. Accordingly, based on the control request from mobile terminal 31, signal processor 100 creates a control command to operate air conditioner 211 in the cooling mode, operating air conditioner 211 in the cooling mode.

Subsequently, if a control request to stop air conditioner 211 is transmitted from mobile terminal 32 to apparatus control device 10 at 23 o'clock, signal processor 100 in apparatus control device 10 controls acquirer 103 to acquire the current time and the human detection information of room 11. At this point of time, because the current time is within the time zone from 22 o'clock to 7 o'clock and the presence of a person in room 11 is detected by human detector 111, signal processor 100 determines that the restriction condition shown in Table 3 is satisfied, and thus determines that air conditioner 211 is operable only by mobile terminal 31. Accordingly, signal processor 100 rejects the control request from mobile terminal 32, and does not stop air conditioner 211.

Thus, if a person is present in room 11 during the time zone from 22 o'clock to 7 o'clock, air conditioner 211 and light fixture 221 in room 11 are preferentially operated by mobile terminal 31 of the user who mainly uses room 11, rather than other mobile terminals 32 and 33. Accordingly, the operational states of air conditioner 211 and light fixture 221 are barely changed by other mobile terminals 32 and 33 after the user who mainly uses room 11 sets the operation of air conditioner 211 or light fixture 221 using mobile terminal 31.

Subsequently, if the person leaves room 11 at 0 o'clock, and a control request to stop air conditioner 211 is transmitted from mobile terminal 32 to apparatus control device 10 at 1 o'clock, signal processor 100 in apparatus control device 10 refers to the correspondence information stored in storage 105. If the current time is 1 o'clock, the current time is within the time zone set in Table 3 (from 22 o'clock to 7 o'clock) but the person is not present in room 11. Accordingly, signal processor 100 determines that the restriction condition is not satisfied, and controls air conditioner 211 to be operable also by mobile terminal 32 other than mobile terminal 31.

Accordingly, signal processor 100 accepts the control request from mobile terminal 32, creates a control command to stop air conditioner 211, and transmits the control command from second communicator 102 to air conditioner 211 to stop air conditioner 211.

In this example, the restriction condition used is the condition that the current time is within the predetermined time zone and a person is present in the place where target electrical apparatus 20 is installed. The restriction condition may be only the condition that a person is present in the place where target electrical apparatus 20 is installed. The restriction condition may also be a combination of the condition that a person is present in the place where target electrical apparatus 20 is installed and another condition described later.

In the present embodiment, the restriction condition for restricting mobile terminal 30 which can control electrical apparatuses 20 may also be a combination of the condition that the current time is within a predetermined time zone and the condition that the power consumption amount of electrical apparatus 20 during a predetermined period is less than a threshold.

Table 4 shows an example of the correspondence information (second correspondence information) showing mobile terminal 30 which can control electrical apparatuses 20 if the restriction condition that the current time is within the predetermined time zone and the power consumption amount of electrical apparatus 20 during a predetermined period is less than a threshold is satisfied.

TABLE 4

| Mobile terminal | Electrical apparatus | Time zone | Power consumption amount |
|---|---|---|---|
| Mobile terminal 31 | Air conditioner 211 | 22:00-7:00 | 2.5 kWh |
|  | Light fixture 221 | 22:00-7:00 | None |
| Mobile terminal 32 | Air conditioner 212 | 0:00-7:00 | 2.0 kWh |

If the correspondence information shown in the Table 4 is set in storage 105, signal processor 100 controls acquirer 103 to acquire the current time from timer 104 and to acquire the power consumption amount of each of electrical apparatuses 20 during the predetermined period (for example, the current day) from measurer 112. Based on the information by acquirer 103, signal processor 100 determines whether the restriction condition that the current time is within the predetermined time zone and the power consumption amount of target electrical apparatus 20 is less than a threshold is satisfied or not. If the restriction condition is satisfied, signal processor 100 restricts mobile terminal 30 which can control electrical apparatuses 20 to mobile terminal 30 specified in the second correspondence information.

At this time, if a restriction condition that the current time is within the time zone from 22 o'clock to 7 o'clock and the power consumption amount of air conditioner 211 is less than 2.5 kWh is satisfied, signal processor 100 restricts mobile terminal 30 which can control air conditioner 211 only to mobile terminal 31. If the restriction condition is not satisfied, signal processor 100 controls air conditioner 211 to be controllable by all of mobile terminals 31 to 33. For example, if the power consumption amount of air conditioner 211 is not less than the threshold, the power consumption amount of air conditioner 211 is excessively large. Accordingly, an operation to stop air conditioner 211 is performed by all of mobile terminals 31 to 33.

If a restriction condition that the current time is within the time zone from 0 o'clock to 7 o'clock and the power consumption amount of air conditioner 212 is less than 2.0 kWh is satisfied, signal processor 100 restricts mobile terminal 30 which can control air conditioner 212 only to mobile terminal 32. If the restriction condition is not satisfied, signal processor 100 controls air conditioner 212 to be controllable by all of mobile terminals 31 to 33.

In this case, the operation of apparatus control device 10 will now be described. For example, if a control request to reduce the cooling temperature of air conditioner 211 by a predetermined temperature is transmitted from mobile terminal 31 to apparatus control device 10 at 22 o'clock, signal processor 100 in apparatus control device 10 refers to the correspondence information stored in storage 105. Signal processor 100 also controls acquirer 103 to acquire the current time from timer 104 and to acquire the measured value of the power consumption amount by air conditioner 211 (for example, the power consumption amount of the current day) from measurer 112.

If signal processor 100 determines that a restriction condition that the current time is within the time zone from 22 o'clock to 7 o'clock and the power consumption amount of air conditioner 211 is less than 2.5 kWh is satisfied, signal processor 100 controls air conditioner 211 to be controllable only by mobile terminal 31. At this time, signal processor 100 accepts the control request from mobile terminal 31. Accordingly, based on the control request from mobile terminal 31, signal processor 100 creates a control command to reduce the cooling temperature of air conditioner 211 by a predetermined temperature, and reduces the cooling temperature of air conditioner 211 by the predetermined temperature.

Subsequently, if a control request to stop air conditioner 211 is transmitted from mobile terminal 32 to apparatus control device 10 at 22:30 o'clock, signal processor 100 in apparatus control device 10 controls acquirer 103 to acquire the current time and the measured value of the power consumption amount by air conditioner 211. At this point of time, because the current time is within the time zone from 22 o'clock to 7 o'clock and the power consumption amount of air conditioner 211 is less than the threshold, signal processor 100 determines that the restriction condition shown in Table 4 is satisfied, and controls air conditioner 211 to be operable only by mobile terminal 31. Accordingly, signal processor 100 rejects the operational signal from mobile terminal 32, and does not stop air conditioner 211.

Thus, if the power consumption amount of air conditioner 211 is less than the threshold in the time zone from 22 o'clock to 7 o'clock, air conditioner 211 is preferentially operated by mobile terminal 31 of the user who mainly uses room 11, rather than by other mobile terminals. Accordingly, the operational state of air conditioner 211 is barely changed by mobile terminal 32 of another user after the user who mainly uses room 11 sets the operation of air conditioner 211 using mobile terminal 31.

Subsequently, if a control request to stop air conditioner 211 is transmitted from mobile terminal 32 to apparatus control device 10 at 23 o'clock in the state where the power consumption amount of the current day of air conditioner 211 is not less than the threshold, signal processor 100 in apparatus control device 10 refers to the correspondence information stored in storage 105. While the current time (23 o'clock) is within the time zone (from 22 o'clock to 7 o'clock) set in Table 4, the power consumption amount of air conditioner 211 is not less than the threshold.

For this reason, signal processor 100 determines that the restriction condition is not satisfied, and controls air conditioner 211 to be operable also by mobile terminal 32 other than mobile terminal 31. Accordingly, signal processor 100 accepts the control request from mobile terminal 32, creates a control command to stop air conditioner 211, and transmits the control command from second communicator 102 to air conditioner 211 to stop air conditioner 211.

In the above example, the restriction condition used is the condition that the current time is within the predetermined time zone and the power consumption amount of target electrical apparatus 20 is less than a threshold. The restriction condition may be only the condition that the power consumption amount of target electrical apparatus 20 is less than a threshold. The restriction condition may also be a combination of the condition that the power consumption amount of target electrical apparatus 20 is less than a threshold and another condition described in the present embodiment.

In the present embodiment, the restriction condition for restricting mobile terminal 30 which can control electrical apparatuses 20 may also be a combination of the condition that the current time is within a predetermined time zone and the condition that mobile terminal 30 is present in a predetermined determination area. In this case, signal processor 100 acquires the current location of mobile terminal 30 from location detector 113 using acquirer 103. Signal processor 100 uses the room in which target electrical apparatus 20 is installed and its adjacent room as the determination area, for example, and restricts mobile terminal 30 which can control target electrical apparatus 20 to mobile terminal 30 which is present in the determination area.

Setting such a restriction condition restricts the control such that mobile terminal 30 located away from electrical apparatuses 20 cannot control electrical apparatuses 20.

The restriction condition may be only the condition that mobile terminal 30 is present in the predetermined determination area. The restriction condition may also be a combination of the condition that mobile terminal 30 is present in a predetermined determination area and another condition described in the present embodiment.

Figure 3:
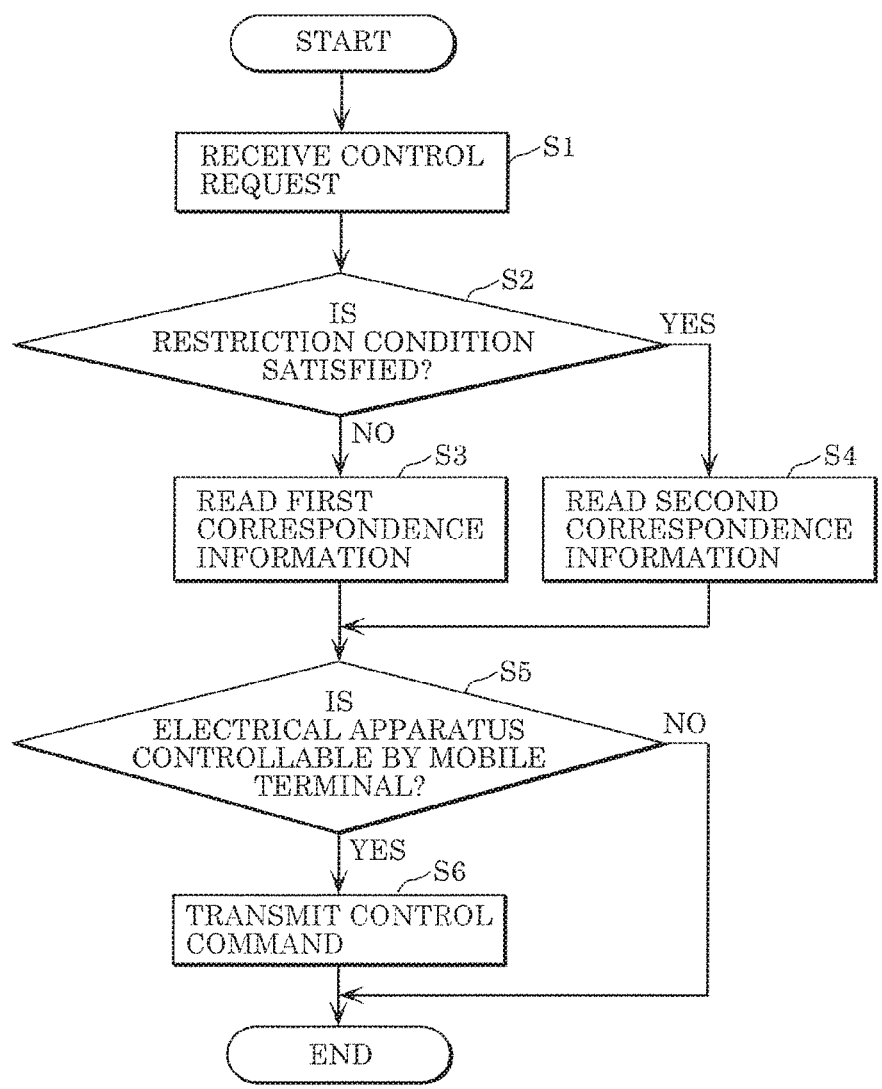
FIG. 3 is a flowchart of an apparatus control device according to an embodiment.

The summary of the above operations of apparatus control device 10 is shown in the flowchart of FIG. 3. Based on the flowchart, the operation of apparatus control device 10 will be described.

If an operation to cause a desired electrical apparatus 20 to perform a desired operation is input from GUI 301 of mobile terminal 30, the content of the operation is output from GUI 301 to signal processor 300. If the content of the operation is input from GUI 301, signal processor 300 transmits a control request including the identification information of target electrical apparatus 20, the content of the control, and the identification information of mobile terminal 30 from communicator 302 to apparatus control device 10.

If first communicator 101 of apparatus control device 10 receives the control request from mobile terminal 30 (Step S1), signal processor 100 reads the restriction condition from storage 105. Signal processor 100 also controls acquirer 103 to acquire the state value used for determination of the restriction condition (such as the current time), and determines whether the restriction condition is satisfied or not (Step S2).

At this time, if the restriction condition is not satisfied, signal processor 100 reads the first correspondence information from storage 105 (Step S3). If the restriction condition is satisfied, signal processor 100 reads the second correspondence information from storage 105 (Step S4).

Signal processor 100 then determines whether or not mobile terminal 30, which is a source of transmitting the control request, is associated with target electrical apparatus 20 in the correspondence information (first correspondence information or second correspondence information) read from storage 105. In other words, based on the correspondence information, signal processor 100 determines whether mobile terminal 30, which is the source of transmitting the control request, can control target electrical apparatus 20 or not (Step S5).

If in the determination of Step S5, signal processor 100 determines that mobile terminal 30 transmitting the control request is not associated with target electrical apparatus 20 in the correspondence information, signal processor 100 rejects the control request, and terminates the processing without transmitting any control command to target electrical apparatus 20.

If in the determination of Step S5, signal processor 100 determines that mobile terminal 30 transmitting the control request is associated with target electrical apparatus 20 in the correspondence information, target electrical apparatus 20, signal processor 100 creates a control command according to the control request. Signal processor 100 transmits the created control command to target electrical apparatus 20 to cause target electrical apparatus 20 to perform the desired operation (Step S6).

Such an operation of apparatus control device 10 enables the control of target electrical apparatuses 20 only by mobile terminal 30 associated with target electrical apparatuses 20 in the correspondence information. In other words, only a specific mobile terminal 30 can control electrical apparatuses 20.

In apparatus control device 10 according to the present embodiment, for each of electrical apparatuses 20, setter 106 may set a degree of priority assigned to each mobile terminal 30 which can control electrical apparatuses 20 in storage 105. If signal processor 100 transmits the control command to electrical apparatus 20 in response to the control request from mobile terminal 30, and subsequently a control request to the same electrical apparatus 20 is transmitted from another mobile terminals 30 having a lower degree of priority than that of mobile terminal 30, signal processor 100 does not need to accept this control request. An example of the degree of priority set in storage 105 is shown in Table 5.

TABLE 5

| Electrical apparatus | Degrees of priority of mobile terminals 31, 32, and 33 |
| --- | --- |
| Air conditioner 211 | 31 > 32 > 33 |

In the example of Table 5, the degrees of priority of mobile terminals 31, 32, and 33 about the operation of air conditioner 211 are assigned. For air conditioner 211 installed in room 11, the degrees of priority are assigned such that mobile terminal 31 of the user who mainly uses room 11 has the highest degree of priority, and mobile terminal 33 has the lowest degree of priority. For electrical apparatuses 20 other than air conditioner 211, the degrees of priority are assigned to mobile terminals 30 which can control electrical apparatuses 20, and are registered in storage 105. For each of electrical apparatuses 20, any degree of priority can be assigned to a plurality of mobile terminals 30 which can operate electrical apparatus 20.

In this case of the operation of air conditioner 211, if an operation to operate air conditioner 211 is performed using mobile terminal 32 having the second highest degree of priority, a control request to operate air conditioner 211 is transmitted from mobile terminal 32 to apparatus control device 10.

If first communicator 101 in apparatus control device 10 receives the control request from mobile terminal 32, signal processor 100 refers to the correspondence information stored in storage 105 to check whether or not mobile terminal 32, which is a source of transmitting the control request, is associated with target air conditioner 211. If mobile terminal 32 is associated with target air conditioner 211 in the correspondence information, signal processor 100 creates a control command to operate air conditioner 211, and transmits the control command from second communicator 102 to air conditioner 211 to operate air conditioner 211.

After signal processor 100 controls air conditioner 211 in response to the control request from mobile terminal 32, signal processor 100 controls air conditioner 211 to be controllable only by mobile terminals 31 and 32 having the degrees of priority equal to or more than that of mobile terminal 32 as shown in Table 6. In Table 6, the term "controllable" in the table refers to the mobile terminal that can control air conditioner 211, and the term "uncontrollable" in the table refers to the mobile terminal that cannot control air conditioner 211.

TABLE 6

| State | Mobile terminal 31 | Mobile terminal 32 | Mobile terminal 33 |
|---|---|---|---|
| Control by Mobile terminal 32 | Controllable | Controllable | Uncontrollable |
| Control by Mobile terminal 31 | Controllable | Uncontrollable | Uncontrollable |

Subsequently, if an operation to change the operational mode of air conditioner 211 is performed using mobile terminal 31 having the highest degree of priority about the operation of air conditioner 211, a control request to operate air conditioner 211 is transmitted from mobile terminal 31 to apparatus control device 10.

If first communicator 101 in apparatus control device 10 receives the control request from mobile terminal 31, signal processor 100 accepts the control request transmitted from mobile terminal 31 because mobile terminal 30 which can control air conditioner 211 is restricted only to mobile terminals 31 and 32. Signal processor 100 creates a control command to change the operational mode of air conditioner 211 based on the control request from mobile terminal 31, transmits the control command from second communicator 102 to air conditioner 211, and changes the operational mode of air conditioner 211.

In response to the control request from mobile terminal 31, signal processor 100 controls air conditioner 211. After that, signal processor 100 controls air conditioner 211 to be controllable only by mobile terminal 31 as shown in Table 6, and does not accept the control requests from mobile terminals 32 and 33 having lower degrees of priority than that of mobile terminal 31.

Thus, after the operation of electrical apparatus 20 is controlled in response to the control request from one mobile terminal 30, apparatus control device 10 controls the same electrical apparatus 20 to be controllable only by mobile terminals 30 having a degree of priority equal to or more than that of this mobile terminal 30. Accordingly, the operational state of electrical apparatus 20 is barely changed by the operation of mobile terminal 30 having a lower degree of priority after the user controls electrical apparatus 20 through the operation of mobile terminal 30.

In the case where apparatus control device 10 accepts a control request from mobile terminal 30 and controls electrical apparatus 20, apparatus control device 10 may reject the control request from mobile terminal 30 having a lower degree of priority until a predetermined period passes. After the predetermined period has passed, apparatus control device 10 may accept the control requests from all of mobile terminals 30.

Apparatus control device 10 according to the present disclosure has been described based on the embodiment, but the present disclosure will not be limited to the embodiment. Embodiments obtained by modification of the embodiment conceivable by those skilled in the art, and other embodiments implemented as any combination of a plurality of components in the embodiment are also included in the present disclosure.

For example, processing executed by a specific component may be executed by another component. Alternatively, the order of execution of the processings may be changed, or a plurality of processings may be executed in parallel.

The present disclosure can be implemented not only as apparatus control device 10, but also as an apparatus controlling method including steps (processings) executed by the components forming apparatus control device 10.

For example, those steps are executed by a computer (computer system). The present disclosure can be implemented as a program for causing a computer to execute the steps included in those processes. Furthermore, the present disclosure can be implemented as a non-transitory computer-readable recording medium, such as a CD-ROM, on which the program is recorded.

For example, in the case where the present disclosure is implemented as a program (software), those steps are executed through execution of the program using hardware resources such as a CPU, a memory, and an input/output circuit of the computer. In other words, the CPU acquires data from the memory or the input/output circuit for computation, or outputs the results of computation to the memory or the input/output circuit to execute those steps.

The plurality of components included in apparatus control device 10 may each be implemented as a dedicated circuit or a general-purpose circuit. These components may be implemented as a single circuit, or may be implemented as a plurality of circuits.

The plurality of components included in apparatus control device 10 may be implemented in the form of an integrated circuit (IC) or a large scale integrated (LSI) circuit. These components may be separately formed into a single chip, or may be formed into a single chip such that part or all of the components are included. The LSI may also be referred to as an integrated circuit (IC), a system LSI, a super LSI, and an ultra LSI, depending on the integration density.

Instead of the use of the LSI for the integration of the components, a dedicated circuit or a general purpose processor may be used for the integration. A field programmable gate array (FPGA), or a reconfigurable processor which allows a circuit cell in the LSI to be reconnected and reconfigured may be used.

In the case where the advancement of the semiconductor technology or another derivative technology thereof introduces a new circuit integrating technique which will replace the LSI, the new technology may be employed as a matter of course to integrate the plurality of components included in apparatus control device 10.

As described above, apparatus control device 10 according to the present embodiment includes first communicator 101, second communicator 102, setter 106, and signal processor (controller) 100. First communicator 101 communicates with mobile terminal 30 carried and used by a user. Second communicator 102 communicates with a plurality of electrical apparatuses 20 used in house (building) 1. Setter 106 sets the correspondence information in storage 105, the correspondence information associating the identification information of mobile terminal 30 with the identification information of electrical apparatus 20 controllable by mobile terminal 30 among the plurality of electrical apparatuses 20. If first communicator 101 receives a control request to control target electrical apparatus 20 among the plurality of electrical apparatuses 20 from mobile terminal 30, signal processor (controller) 100 operates as follows. If the identification information of mobile terminal 30, which is a source of transmitting the control request, is associated with the identification information of target electrical apparatus 20 in the correspondence information, signal processor (controller) 100 controls the communication of second communicator 102 such that second communicator 102 transmits the control command to target electrical apparatus 20. If the identification information of mobile terminal 30, which is the source of transmitting the control request, is not associated with the identification information of target electrical apparatus 20 in the correspondence information, signal processor (controller) 100 controls the communication of second communicator 102 such that second communicator 102 does not transmit the control command to target electrical apparatus 20.

Thereby, apparatus control device 10 can restrict electrical apparatuses 20 controllable by mobile terminal 30 to electrical apparatuses 20 associated with mobile terminal 30 in the correspondence information. Accordingly, apparatus control device 10 can restrict electrical apparatuses 20 such that the operational states of electrical apparatuses 20 not associated with mobile terminal 30 in the correspondence information cannot be changed by mobile terminal 30.

In the present embodiment, as the correspondence information, the first correspondence information if the restriction condition is not satisfied and the second correspondence information if the restriction condition is satisfied may be set in storage 105 by setter 106. In the present embodiment, the restriction condition is a restriction condition for restricting mobile terminal 30 and electrical apparatuses 20 controllable by mobile terminal 30. Apparatus control device 10 may include acquirer 103 which acquires the current state value to be used to determine the restriction condition. Based on the current state value acquired by signal processor (controller) 100, acquirer 103 may determine whether the restriction condition is satisfied or not, and may use the first correspondence information if the restriction condition is not satisfied and may use the second correspondence information if the restriction condition is satisfied.

Thereby, in the case where the restriction condition is satisfied, compared to the case where the restriction condition is not satisfied, apparatus control device 10 can restrict mobile terminal 30 which can control target electrical apparatus 20. In other words, if the restriction condition is satisfied, apparatus control device 10 can control such that target electrical apparatus 20 is not controlled by any other mobile terminal than mobile terminal 30 associated with target electrical apparatus 20 in the second correspondence information.

In the present embodiment, the restriction condition may include a condition that the current time is within the time zone for restricting mobile terminal 30 and electrical apparatuses 20 controllable by mobile terminal 30. Acquirer 103 may acquire the current time as a state value from timer 104 which counts the time. Based on the current time acquired by acquirer 103, signal processor (controller) 100 may determine whether the condition that the current time is within the time zone is satisfied or not.

Thereby, for example, if the current time is within the time zone set, apparatus control device 10 can restrict the control such that target electrical apparatus 20 can be controlled only by mobile terminal 30 associated with target electrical apparatus 20 in the second correspondence information, and cannot be controlled by other mobile terminals 30.

In the present embodiment, the restriction condition may include a condition that a person is present in the place where target electrical apparatus 20 is installed. Acquirer 103 may acquire the result of detection as a state value from human detector 111 which detects whether or not a person is present in the place where target electrical apparatus 20 is installed. Based on the result of detection acquired by acquirer 103, signal processor (controller) 100 may determine whether the condition that a person is present in the place where target electrical apparatus 20 is installed is satisfied or not.

Thereby, for example, if a person is present in the place where target electrical apparatus 20 is installed, apparatus control device 10 can control target electrical apparatus 20 such that target electrical apparatus 20 can be controlled only by mobile terminal 30 associated with target electrical apparatus 20 in the second correspondence information, and cannot be controlled by other mobile terminals 30.

In the present embodiment, the restriction condition may include a condition that is based on the comparison of the power consumption amount of target electrical apparatus 20 with the threshold. Acquirer 103 may acquire the measured value as a state value from measurer 112 which measures the power consumption amount of target electrical apparatus 20. Based on the measured value acquired by acquirer 103, signal processor (controller) 100 may determine whether the condition that is based on the comparison of the power consumption amount of target electrical apparatus 20 with the threshold is satisfied or not.

Thereby, if the condition that is based on the comparison of the power consumption amount of target electrical apparatus 20 with the threshold is satisfied, signal processor (controller) 100 restricts control such that target electrical apparatus 20 can be controlled only by mobile terminal 30 associated with target electrical apparatus 20 in the second correspondence information, and cannot be controlled by other mobile terminals 30. For example, if the restriction condition is the condition that the power consumption amount of electrical apparatus 20 is less than a threshold, mobile terminal 30 which can control electrical apparatus 20 having a power consumption amount of less than the threshold is restricted by the second correspondence information. If the power consumption amount of electrical apparatus 20 exceeds the threshold, the restriction condition is no longer satisfied, and electrical apparatus 20 becomes controllable by all of mobile terminals 30. Accordingly, any of mobile terminals 30 can perform the operation to stop electrical apparatus 20.

In the present embodiment, the restriction condition may include the condition that mobile terminal 30 is present in the determination area. Acquirer 103 may acquire the current location of mobile terminal 30 as a state value from location detector 113 which detects the current location of mobile terminal 30. Based on the current location of mobile terminal 30 acquired by acquirer 103, signal processor (controller) 100 may determine whether the condition that mobile terminal 30 is present in the determination area is satisfied or not.

Thereby, if the condition that mobile terminal 30 is present in the determination area is satisfied, electrical apparatus 20 can be controlled by mobile terminal 30 associated with target electrical apparatus 20 in the second correspondence information. For example, if the determination area is the location in which electrical apparatus 20 is installed and its surrounding area, apparatus control device 10 can restrict the control such that electrical apparatus 20 is controlled only by mobile terminal 30 which is present in the determination area, and electrical apparatus 20 is not controlled by mobile terminal 30 located in a place away from the determination area.

In the present embodiment, for each of a plurality of the mobile terminals 30, setter 106 may set the correspondence information in storage 105, the correspondence information associating the identification information of mobile terminal 30 with the identification information of electrical apparatus 20. In the present embodiment, the identification information of electrical apparatus 20 is the identification information of electrical apparatus 20 controllable by mobile terminal 30 among the plurality of electrical apparatuses 20.

Thereby, apparatus control device 10 can restrict mobile terminal 30 which can control target electrical apparatus 20 only to mobile terminal 30 associated with target electrical apparatus 20 in the correspondence information. Apparatus control device 10 can restrict the control such that the operational state of target electrical apparatus 20 cannot be changed by other mobile terminals 30.

In the present embodiment, for electrical apparatus 20 controllable by the plurality of mobile terminals 30, setter 106 may set degrees of priority assigned to the plurality of mobile terminals 30 in storage 105. After second communicator 102 transmits the control command to target electrical apparatus 20 in response to the control request received by first communicator 101 from one of mobile terminals 30, signal processor (controller) 100 may perform the following operation. In other words, this operation is an operation to control the communication of second communicator 102 such that second communicator 102 does not transmit the control command to target electrical apparatus 20 even if first communicator 101 receives the control request to control the same target electrical apparatus 20 from other mobile terminals 30. At this time, other mobile terminals 30 are mobile terminals 30 having degrees of priority lower than that of mobile terminal 30 which has already transmitted the control request.

Thereby, after the operation of electrical apparatus 20 is controlled through the operation of one mobile terminal 30, another mobile terminal 30 having a degree of priority lower than that of this mobile terminal 30 cannot control electrical apparatus 20. Accordingly, the operation of electrical apparatus 20 is barely changed by mobile terminal 30 having a low degree of priority.

In the present embodiment, the apparatus controlling method includes first communicating with mobile terminal 30 carried and used by a user. The apparatus controlling method also includes second communicating with a plurality of electrical apparatuses 20 used in house (building) 1. The apparatus controlling method includes setting correspondence information in storage 105, the correspondence information associating the identification information of mobile terminal 30 with the identification information of electrical apparatus 20 controllable by mobile terminal 30 among the plurality of electrical apparatuses 20. The apparatus controlling method also includes controlling the communication in the second communicating as follows when a control request to control target electrical apparatus 20 among the plurality of electrical apparatuses 20 is received from mobile terminal 30 in the first communicating. Namely, the communication in the second communicating is controlled so as to transmit the control command to target electrical apparatus 20 if the identification information of mobile terminal 30, which is a source of transmitting the control command, is associated with the identification information of target electrical apparatus 20 in the correspondence information. The communication in the second communicating is controlled so as not to transmit the control command to target electrical apparatus 20 if the identification information of mobile terminal 30, which is the source of transmitting the control command, is not associated with the identification information of target electrical apparatus 20 in the correspondence information.

Thereby, electrical apparatuses 20 controllable by mobile terminal 30 are restricted to electrical apparatuses 20 associated with mobile terminal 30 in the correspondence information. Accordingly, the control can be restricted such that the operational states of electrical apparatuses 20 not associated with mobile terminal 30 in the correspondence information cannot be changed by mobile terminal 30.

In the present embodiment, the program is a program for causing a computer to execute the apparatus controlling method. In the present embodiment, the apparatus controlling method includes first communicating with mobile terminal 30 carried and used by a user. The apparatus controlling method also includes second communicating with a plurality of electrical apparatuses 20 used in house (building) 1. The apparatus controlling method includes setting correspondence information in storage 105, the correspondence information associating the identification information of mobile terminal 30 with the identification information of electrical apparatus 20 controllable by mobile terminal 30 among a plurality of electrical apparatuses 20. The apparatus controlling method also includes controlling the communication in the second communicating as follows when a control request to control target electrical apparatus 20 among the plurality of electrical apparatuses 20 is received from mobile terminal 30 in the first communicating. Namely, the communication in the second communicating is controlled so as to transmit the control command to target electrical apparatus 20 if the identification information of mobile terminal 30, which is a source of transmitting the control command, is associated with the identification information of target electrical apparatus 20 in the correspondence information. The communication in the second communicating is controlled so as not to transmit the control command to target electrical apparatus 20 if the identification information of mobile terminal 30, which is the source of transmitting the control command, is not associated with the identification information of target electrical apparatus 20 in the correspondence information.

Thereby, electrical apparatuses 20 controllable by mobile terminal 30 are restricted to electrical apparatuses 20 associated with mobile terminal 30 in the correspondence information. Accordingly, the control is possible such that the operational states of electrical apparatuses 20 not associated with mobile terminal 30 in the correspondence information cannot be changed by mobile terminal 30.

The program according to the present disclosure is a program executed by the computer to cause the computer to operate as apparatus control device 10 described above. This program may be recorded on a computer-readable recording medium. In this case, the computer may execute the program read from the recording medium.

Another program according to the present disclosure is a program for causing the computer to operate as communicator 302, GUI (input interface) 301, and signal processor (controller) 300. Communicator 302 communicates with the plurality of electrical apparatuses 20 in house (building) 1. GUI (input interface) 301 accepts an operation to control a desired electrical apparatus 20 among the plurality of electrical apparatuses 20. When GUI (input interface) 301 accepts the operation, signal processor 300 reads the correspondence information, in which controllable electrical apparatuses 20 among the plurality of electrical apparatuses 20 are set, from storage 303. If target electrical apparatus 20 is set in the correspondence information, signal processor (controller) 300 transmits the control command from communicator 302 to target electrical apparatus 20. If target electrical apparatus 20 is not set in the correspondence information, signal processor (controller) 300 does not transmit the control command from communicator 302 to target electrical apparatus 20.

Such a program incorporated in mobile terminal 30 enables direct operation of electrical apparatus 20 by mobile terminal 30. Additionally, mobile terminal 30 which can control target electrical apparatus 20 is restricted to mobile terminal 30 associated with target electrical apparatus 20 in the correspondence information, and other mobile terminals 30 are restricted so as not to change the operational state of target electrical apparatus 20. This program may also be recorded in a computer-readable recording medium. In this case, the computer may execute the program read from the recording medium.

The invention claimed is:

1. An apparatus control device, comprising:
a first communicator which communicates with a mobile terminal carried and used by a user;
a second communicator which communicates with a plurality of electrical apparatuses used in a building;
a setter which sets correspondence information in a storage, the correspondence information associating identification information of the mobile terminal with identification information of an electrical apparatus controllable by the mobile terminal among the plurality of electrical apparatuses; and
a controller which controls, when the first communicator receives, from the mobile terminal, a control request to control a target electrical apparatus among the plurality of electrical apparatuses, communication of the second communicator such that the second communicator transmits a control command to the target electrical apparatus if the identification information of the mobile terminal, which is a source of transmitting the control request, is associated with identification information of the target electrical apparatus in the correspondence information, and such that the second communicator does not transmit the control command to the target electrical apparatus if the identification information of the mobile terminal, which is the source of transmitting the control request, is not associated with the identification information of the target electrical apparatus in the correspondence information,
wherein the setter sets the correspondence information in the storage, the correspondence information being first correspondence information if a restriction condition for restricting the mobile terminal and the electrical apparatus controllable by the mobile terminal is not satisfied, and second correspondence information if the restriction condition is satisfied,
the apparatus control device further comprises an acquirer which acquires a current state value to be used to determine the restriction condition, and
based on the current state value acquired by the acquirer, the controller determines whether the restriction condition is satisfied or not, and uses the first correspondence information if the restriction condition is not satisfied, and uses the second correspondence information if the restriction condition is satisfied.

2. The apparatus control device according to claim 1,
wherein the restriction condition includes a condition that a current time is within a time zone for restricting the mobile terminal and the electrical apparatus controllable by the mobile terminal,
the acquirer acquires the current time as the current state value from a timer which counts time, and
based on the current time acquired by the acquirer, the controller determines whether the condition that the current time is within the time zone is satisfied or not.

3. The apparatus control device according to claim 1,
wherein the restriction condition includes a condition that a person is present in a place where the target electrical apparatus is installed,
the acquirer acquires a result of detection as the current state value from a human detector which detects whether or not a person is present in the place where the target electrical apparatus is installed, and
based on the result of detection acquired by the acquirer, the controller determines whether the condition that a person is present in the place where the target electrical apparatus is installed is satisfied or not.

4. The apparatus control device according to claim 1,
wherein the restriction condition includes a condition that is based on a comparison of a power consumption amount of the target electrical apparatus with a threshold,
the acquirer acquires a measured value as the current state value from a measurer which measures the power consumption amount of the target electrical apparatus, and
based on the measured value acquired by the acquirer, the controller determines whether the condition that is based on the comparison of the power consumption amount of the target electrical apparatus with the threshold is satisfied or not.

5. The apparatus control device according to claim 1,
wherein the restriction condition includes a condition that the mobile terminal is present in a determination area,
the acquirer acquires a current location of the mobile terminal as the current state value from a location detector which detects the current location of the mobile terminal, and
based on the current location of the mobile terminal acquired by the acquirer, the controller determines whether the condition that the mobile terminal is present in the determination area is satisfied or not.

6. An apparatus control device, comprising:
a first communicator which communicates with a mobile terminal carried and used by a user;
a second communicator which communicates with a plurality of electrical apparatuses used in a building;
a setter which sets correspondence information in a storage, the correspondence information associating identification information of the mobile terminal with identification information of an electrical apparatus controllable by the mobile terminal among the plurality of electrical apparatuses; and
a controller which controls, when the first communicator receives, from the mobile terminal, a control request to control a target electrical apparatus among the plurality of electrical apparatuses, communication of the second communicator such that the second communicator transmits a control command to the target electrical apparatus if the identification information of the mobile terminal, which is a source of transmitting the control request, is associated with identification information of the target electrical apparatus in the correspondence information, and such that the second communicator does not transmit the control command to the target electrical apparatus if the identification information of the mobile terminal, which is the source of transmitting the control request, is not associated with the identification information of the target electrical apparatus in the correspondence information, wherein for each of a plurality of the mobile terminals, the setter sets the correspondence information in the storage, the correspondence information associating the identification information of the mobile terminal with the identification information of the electrical apparatus controllable by the mobile terminal among the plurality of electrical apparatuses, and wherein for the electrical apparatus controllable by the plurality of mobile terminals, the setter sets degrees of priority assigned to the plurality of mobile terminals in the storage, and the controller controls the communication of the second communicator such that the second communicator does not transmit the control command to the target electrical apparatus if the second communicator transmits the control command to the target electrical apparatus in response to the control request transmitted from one mobile terminal of the plurality of mobile terminals and received by the first communicator, and subsequently the first communicator receives a control request to control the same target electrical apparatus from another mobile terminal having a degree of priority lower than a degree of priority of the one mobile terminal.

7. An apparatus controlling method, comprising:

first communicating with a mobile terminal carried and used by a user;

second communicating with a plurality of electrical apparatuses used in a building;

setting correspondence information in a storage, the correspondence information associating identification information of the mobile terminal with identification information of an electrical apparatus controllable by the mobile terminal among the plurality of electrical apparatuses; and controlling, when a control request to control a target electrical apparatus among the plurality of electrical apparatuses is received from the mobile terminal in the first communicating, the communication in the second communicating such that a control command to the target electrical apparatus is transmitted if the identification information of the mobile terminal, which is a source of transmitting the control request, is associated with identification information of the target electrical apparatus in the correspondence information, and such that the control command is not transmitted to the target electrical apparatus if the identification information of the mobile terminal, which is the source of transmitting the control request, is not associated with the identification information of the target electrical apparatus in the correspondence information, wherein, in the setting, the correspondence information is set in the storage, the correspondence information being first correspondence information if a restriction condition for restricting the mobile terminal and the electrical apparatus controllable by the mobile terminal is not satisfied, and second correspondence information if the restriction condition is satisfied, the apparatus control method further comprising acquiring a current state value to be used to determine the restriction condition, and in the controlling, whether the restriction condition is satisfied or not is determined based on the current state value acquired in the acquiring, and the first correspondence information is used if the restriction condition is not satisfied, and the second correspondence information is used if the restriction condition is satisfied.

* * * * *